3,772,411
ALKALI METAL SALTS OF ARALKANOIC OR ARALKENOIC ACIDS TO IMPROVE DYEABILITY OF POLYOLEFIN COMPOSITIONS
Christopher W. Uzelmeier, Laurel Springs, and Carl W. Schroeder, Cherry Hill, N.J., assignors to Shell Oil Company, New York, N.Y.
No Drawing. Filed Apr. 19, 1971, Ser. No. 135,478
Int. Cl. C08f 29/12
U.S. Cl. 260—897 B    2 Claims

ABSTRACT OF THE DISCLOSURE

This invention provides improved polyolefin compositions which are comprised of (a) a poly-1-monoolefin, (b) a copolymer of ethylene and an aminoalkyl acrylate compound having the following formula:

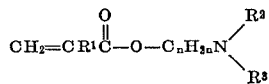

wherein $R^1$ is hydrogen or methyl, $R^2$ and $R^3$ are either hydrogen or a lower alkyl group, and $n$ is an integer of from 1 to 4, inclusive, and (c) an alkali metal salt of an aralkanoic or aralkenoic acid. In addition to the components that are hereinbefore set forth, the compositions of this invention are modified for some uses by addition of an acrylonitrile-butadiene-styrene-terpolymer.

The polyolefin compositions may be molded into fibers, films, and other shaped articles.

BACKGROUND OF THE INVENTION

Field of the invention

The present invention relates to improved polyolefin compositions and more particularly to improved dyeable polyolefin compositions.

Description of the prior art

It is known that polyolefins, e.g., crystalline polypropylene and polyethylene, may be molded into fibers, films and other shaped articles possessing excellent physical and mechanical properties. These polyolefins alone, however, cannot be adequately dyed using conventional dying methods and dyestuffs. For this reason, much study has been done for many years to improve the affinity of polyolefins for dyestuffs and a number of means have been heretofore proposed.

The dyeability of polyolefins by disperse dyes has been improved by blending with other more dye receptive polymers or copolymers, including acrylonitrile-butadiene-styrene terpolymer, as disclosed in U.S. Pat. No. 3,299,185.

Success in improving the dyeability of polyolefins by acid dyes has been described in U.S. Pat. No. 3,395,198. That patent shows that when a copolymer of ethylene and an aminoalkyl acrylate compound is added to a polyolefin, such as polypropylene, the resulting composition exhibits improved dyeability particularly by acid dyes, and that such a polyolefin composition is fully comparable with polyolefin itself in physical properties and yet is far superior to polyolefin alone in dyeability and fastness. Although the addition of a copolymer of ethylene and an aminoalkyl acrylate compound does improve the dyeability of the polyolefin composition without impairing the physical properties thereof, such an additive can be rather costly. If the amount of such an additive can be substantially decreased without hindering the dyeability and desired physical properties of the polyolefin, a substantial cost saving can be realized.

It has now been found that the use of a small amount of an alkali metal salt of certain aralkanoic or aralkenoic acids substantially reduces the amount of the copolymer of ethylene and aminoalkyl acrylate compound needed to impart to the polyolefin composition adequate dyeability and use of such salts does not adversely affect the quality of the resulting polyolefin composition.

Although metal salts of carboxylic and polycarboxylic acids have been used in the past to improve the crystallizability, clarity, hardness, tensile properties and injection molding properties of polypropylene (U.S. 3,207,739), it is quite surprising indeed to find that such a salt could be used to decrease the amount of additive needed to improve the dyeability of poly-1-monoolefin compositions.

OBJECTS OF THE INVENTION

It is an object of this invention to provide poly-1-monoolefin compositions which are receptive to acid types of dyes. It is another object of this invention to provide a dyeable polyolefin composition which requires less ethylene and aminoalkyl acrylate copolymer per unit of poly-1-monoolefin than previously required under prior art. Other objects of this invention will be apparent from the following description.

SUMMARY OF THE INVENTION

This invention provides moldable polyolefin compositions consisting essentially of (a) a poly-1-monoolefin, (b) at least one copolymer consisting essentially of ethylene and an aminoalkyl acrylate compound of the following general formula:

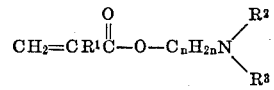

wherein $R^1$ is hydrogen or methyl, each of $R^2$ and $R^3$ is hydrogen or an alkyl group of from 1 to 4 carbon atoms and $n$ is an integer of from 1 to 4, inclusive, said copolymer containing from 5 to 50 mol percent of units derived from said aminoalkyl acrylate compound and having an intrinsic viscosity of 0.1 to 4.0 dl./g. measured in Tetralin solution at 130° C., the content of said copolymer being 1 to 30 weight percent based on weight of the poly-1-monoolefin and (c) 0.01 to 1.0 weight percent of an alkali metal salt of certain aralkanoic or aralkenoic acids based upon the weight of said poly-1-monoolefin.

The above compositions can be modified, according to an embodiment of this invention, to provide polyolefin compositions which are receptive to both disperse and acid-type dyes. This requires that 1.0–10.0 percent by weight of a terpolymer consisting essentially of acrylonitrile, butadiene and styrene be included in the hereinbefore described moldable polyolefin composition.

DESCRIPTION OF THE PREFERRED EMBODIMENTS

The polyolefins which are used as the basic component of the present invention are poly-1-monoolefins and include, for example, polyethylene, polypropylene, polybutene-1, poly-4-methylpentene-1, and the like. The commerical value of the isotactic polypropylene synthesized with the Ziegler-Natta type catalyst is particularly enhanced by the embodiment of this invention and for this reason is preferred.

One component used in the production of the above-mentioned ethylene-aminoalkyl acrylate copolymer which, with polyolefins, is used to make up the compositions of this invention, is an aminoalkyl acrylate compound of the general formula shown in the Summary of the Invention. These copolymers and aminoalkyl acrylate compounds are known in the art, and a detailed description of them and their use in providing improved dyeability to polyolefin compositions is given in said U.S. Pat. 3,395,198.

Those aminoalkyl acrylate compounds which are generally preferred in the preparation of the copolymers include, N,N-dimethylaminoethyl acrylate, aminoethyl acrylate, N-methylaminoethyl acrylate, N-n-butylaminoethyl acrylate, N,N-di-n-butylaminoethyl acrylate, N,N-dimethylaminobutyl acrylate, and N,N-dimethylaminoethyl methacrylate.

These copolymers may usually be produced by contacting ethylene with an aminoalkyl acrylate compound having the above-mentioned general formula in the presence of at least one free-radical catalyst which may be selected from the group consisting of oxygen, organic peroxides, azo compounds, diazo compounds, and the like at a pressure (ethylene) of 500 to 4000 kg./cm.$^2$ and at a temperature of 40 to 300° C.

In the preparation of the moldable polyolefin compositions of this invention, about 2 to 25 weight percent (based upon the polyolefin) of the copolymer is added to polyolefin. If the amount of said copolymer were below 2% by weight based on the polyolefin, the dyeability of the resulting composition would not be as high as practically desirable, while if more than 25% by weight (based upon the polyolefin) of the copolymer were used, the composition might lose, in substantial degrees, the desirable characteristics of the polyolefin. While it depends upon the desired depth of shade and the amount of salt and/or terpolymer, the range of amount of copolymer needed is less than that shown in the prior art and is generally from 2 to 10 weight percent for fiber and 2 to 15 weight percent for films and other shaped articles, the percentage being based upon the weight of the polyolefin. It is especially preferred to be present in amounts of from 3 to 7 percent by weight based on polyolefin.

The component used in the production of these dyeable polyolefin compositions which provides the point of novelty to these compositions is the alkali metal salt of an aralkanoic or aralkenoic acid. By alkali metal is meant sodium, lithium, potassium and other metals from group I-A of the Periodic Chart of Elements as illustrated in Handbook of Chemistry by Lange, 7th Edition, 1949, pp. 58-59. By aralkanoic or aralkenoic acid is meant a substituted or unsubstituted arylalkyl or alkenyl carboxylic acid of from 7 to 15 carbon atoms per molecule wherein the aryl portion is a substituted or unsubstituted benzene or naphthenic ring. Substitution can occur on the aromatic ring by from 1 to a plurality of lower alkyl groups of from 1 to 4 carbon atoms. The alkyl or alkenyl carboxylic acid moiety can contain from 1 to 3 carbon atoms. Salts which are useful include the alkali metal salts of benzoic acid, toluic acid, naphthoic acid, cinnamic acid, p-tert-butyl benzoic acid and the like. Preferred are the alkali metal salts of benzoic acid and lower alkyl substituted benzoic acids of from 8 to 12 carbon atoms. Especially preferred are sodium benzoate, potassium benzoate and lithium benzoate.

The amount of the aforementioned salt that is required in the compositions according to this invention will vary between .01–1.0 percent by weight of the polyolefin moiety, and preferably will be between about 0.1–0.5 percent by weight.

The polyolefin compositions according to this invention can be modified to become dyeable by disperse types of dyes as well as acid dyes. In order to obtain such a result, a terpolymer of acrylonitrile, butadiene and styrene (ABS) is used in combination with the three aforementioned components. The amount of this terpolymer to be added will be between about 1–10 percent by weight of the polyolefin with the preferable amount being about 1–5 percent by weight of the polyolefin component. Generally, the characteristics of the ABS terpolymers suitable for use in this invention are described in the Modern Plastics Encyclopedia 1968, September 1967, vol. 45, No. 1A, McGraw Hill, pp. 111–114. In general it is found that nearly any ABS terpolymer can be used for the purposes of this invention, but for better dyeability, a higher percentage of butadiene is desirable in the ABS. Commercially available ABS products suitable for use in this invention include products available from Marbon, Inc., such as Cycolac DH, Cycolac AM, Cycolac H and Cycolac TD, the latter two being preferred.

The above-mentioned component materials of the present invention may be readily admixed mechanically to prepare a homogeneous composition. The admixing or blending can thus be performed by means of a Banbury mixer or other suitable mixer at elevated temperature or, alternatively, a multi-stage extruding techniques may be utilized to perform the required mixing and extrusion at the same time. In the course of mixing or prior thereto, some suitable known polyolefin stabilizer, such as antioxidant (e.g., alkylphenol compounds), ultraviolet-absorption inhibitor (e.g., benzophenone derivatives), heat-resisting stabilizer (e.g., the thioether compound of carboxylic acid ester) and other known useful additives or combination of these may also be added to the polyolefin compositions without departing from the scope of the present invention.

Comparisons of dyeability may be made visually with respect to the shades of molded products, but for accuracy, measurements are best carried out by means of optical instruments, or from the amount of dye exhaustion per unit quantity of products. Particularly in the case of fiber, it is usual to take the dye exhaustion amounts as criteria.

The three-component polyolefin compositions, i.e., compositions comprising a poly-1-monoolefin, a copolymer of ethylene and an aminoalkyl acrylate and an alkali metal salt of an aralkanoic or aralkenoic acid have a high affinity for acid dyestuffs, metallized dyestuffs, chrome dyestuffs and other anionic dyestuffs, particularly great for acid dyestuffs. Examples of dyestuffs utilizable in this invention can be found in U.S. Pat. No. 3,395,198.

The fibers made from the compositions of this invention, when dyed have high fastness to sunlight, laundering, dry cleaning, and other conditions. The homogeneity of the compositions of this invention may be clearly seen when the dyes film is examined with the naked dye or under a microscope or when the dyed fiber bundle is set with epoxy resin and cut and its cross section is microscopically examined.

The fact that the compositions of this invention are substantially homogeneous can also become apparent when one considers the fact that the mechanical strength of the products made from the same are almost equal to that of the polyolefin used. For example, the strength of the fiber prepared from the present composition consisting of polypropylene, 5% by weight (based on the polypropylene) of ethylene/aminoalkyl acrylate copolymer and 0.5% sodium benzoate is virtually identical to the strength of the fiber prepared from the same polypropylene itself under the same conditions.

It will be apparent from the above description that the compositions of this invention have improved affinities to dyestuff, retaining the desirable mechanical properties of polyolefin. It is also to be noted that the compositions are also superior to plain polyolefin in printing qualities. Thus, films or other products made of these compositions can be printed attractively.

PREPARATION

In order to put the question of dye receptor content in better perspective, it is helpful to consider the stoichiometric relationship between fiber and dye. Consider an example of polypropylene fiber containing 5% copolymer of ethylene and an aminoalkyl acrylate with no salt added and being dyed with 2% on weight of fiber (OWF) Merpacyl Blue SW. A 100 gram quantity of this fiber contains 9.6 millimoles of aminoalkyl acrylate dyesite while 2 g. of Merpacyl Blue SW (Acid Blue 25, C.I. 62055, molecular weight=416) is equal to 4.8 millimoles. Thus, half the original number of dyesites would remain after complete exhaustion of the dye bath. It can be seen that not every dyesite available is utilized in order to achieve adequate dying. The addition of a small percentage of an alkali metal salt of an aralkanoic acid, such as sodium benzoate, allows adequate dying without the need for as great an excess of dyesites present in the polyolefin composition. The salt makes a greater number of the theoretical dyesites available and allows better utilization of the dye, as pointed out in Table 2 of Example I. Thus, at a level of 5% of the ethylene-aminoalkyl acrylate copolymer there are theoretically enough dyesites available for adequate dyeability but in actual practice they aren't utilized. The presence of the salt allows for greater utilization of existing dyesites. Of course, the exact stoichiometry will vary in each case, depending on the type and amount of dyes used and the exact proportions of dye receptor. It can be seen that under proper dyeing conditions and dye selection, only low levels of the copolymer of ethylene and aminoalkyl acrylate would be required for good dyeability and the level needed is decreased by adding a small percentage of a salt such as sodium benzoate.

This invention will be further explained in detail with reference to the following examples which are given by way of illustration only and not by way of limitation.

EXAMPLE I

A laboratory experiment was set up to determine the effect of the addition of small amounts of sodium and lithium benzoate on the dyeability of a polypropylene composition containing a copolymer of ethylene and an aminoalkyl acrylate. In all samples prepared the same copolymer was used to prepare the polypropylene compositions. The fibers were prepared by fibrillating chill roll cast film as taught in U.S. Pat. 3,500,517. The resulting fibers were then dyed under the conditions set forth in Table 2.

Table 1 describes the contents of the polypropylene compositions used to prepare the fibers. Table 2 shows the dying conditions for the samples described in Table 1 and rates the dyeability of each.

TABLE 1.—SAMPLE DESCRIPTION ACID DYEABLE POLYPROPYLENE FIBERS

| Sample No. | Additives | | |
|---|---|---|---|
| | Stabilization system | Salt | Aminoalkyl methacrylate |
| 1 | A [1] | None | 7.0 |
| 2 | B [2] | do | 5.0 |
| 3 | B | NaBz [3] (0.10%) | 5.0 |
| 4 | A | NaBz (0.25%) | 5.0 |
| 5 | A | do | 4.0 |
| 6 | A | LiBz [4] (0.25%) | 5.0 |
| 7 | A | PTBBA [5] | 5.0 |
| 8 | A | NaBz (0.25%) | 4.0 |

[1] A is a mixture of various commercial polyolefin stabilizers including an ultra-violet absorption inhibitor.
[2] B is a mixture of various commercial polyolefin stabilizers without an ultra-violet absorption inhibitor.
[3] NaBz is sodium benzoate.
[4] LiBz is lithium benzoate.
[5] PTBBA is p-tert-butylbenzoic acid.

TABLE 2.—PERFORMANCE OF ACID DYEABLE POLYPROPYLENE FIBERS

| Sample No. | Dyeing conditions | | | Dyeability [1] | | | |
|---|---|---|---|---|---|---|---|
| | pH | Alkanol ND, [4] percent OWF [5] | Na₂SO₄, percent OWF | Xylene [2] carrier, percent OWF | Dye uptake, percent | Scour loss, percent | Dye utilization, percent | Cross-sectional dye penetration [3] |
| 1 | 2 | 2 | | | 84 | 4 | 80 | 10% surface dyed only. |
| 2 | 2 | 2 | | 15 | 70 | 6 | 64 | 50% surface dyed only. |
| 3 | 2 | 2 | | 15 | 87 | 2 | 85 | Complete and level. |
| 3 | 2 | | 10 | | 88 | 6 | 82 | Complete but unlevel. |
| 3 | 2 | | 10 | 15 | 96 | 6 | 90 | Complete and level. |
| 3 | 2 | | | 15 | 95 | 5 | 90 | Do. |
| 4 | 2 | 2 | | 15 | 86 | 2 | 84 | Do. |
| 5 | 2 | 2 | | 15 | 84 | 3 | 81 | Do. |
| 6 | 2 | 2 | | 15 | 82 | 4 | 78 | Do. |
| 7 | 2 | 2 | | 15 | 77 | 4 | 73 | 10% surface dyed only. |
| 8 | 2 | 2 | | 15 | 94 | 5 | 89 | Complete and leve[l]. |

[1] 2% OWF Merpacyl Red G (Acid Red 337).
[2] Based on amount of xylene (carrier is 50% xylene: water emulsion).
[3] Percentages indicate approximate content of surface-dyed fibers in total-dyed fiber bundle.
[4] Alkanol ND=a sodium arylsulfonate.
[5] OWF=on weight of fiber.

The important point emerging from the data presented in Tables 1 and 2 is that the addition of a small percentage of sodium or lithium benzoate (referred to as "salt") greatly improves the dye uptake and penetration of the fibers. Although the dyeing conditions also affect the results, it is clear that the addition of sodium or lithium benzoate does improve the overall dyeability whatever the dyeing conditions shown.

It is interesting to not that improved dyeability is obtained from sodium benzoate, which is known to be a crystal nucleating agent, while another known crystal nucleating agent, p-(tert-butyl)benzoic acid (PTBBA) does not result in any improvements. This would tend to indicate that the nucleational characteristics are not the determining factors for dyeability enhancement.

EXAMPLE II

A laboratory experiment was set up to determine the effect of the addition of a small amount of sodium benzoate on the dyeability of a polypropylene composition containing the same ethylene/aminoalkyl methacrylate copolymer as in Example I and an ABS terpolymer.

Table III rates the dyeability for the samples described below under the dyeing and pretreatment conditions also described below.

Sample description

Sample A:                                      Percent by weight
    Cycolac AM _____ 4.5
    Aminoalkyl acrylate of Example I _____ 5.0
    Polypropylene _____ 90.3
    Sodium benzoate _____ 0.2
Sample B:
    Cycolac AM _____ 4.5
    Aminoalkyl acrylate of Example I _____ 5.0
    Polypropylene _____ 90.5

Pretreatment (1) 2 g./l. NaHSO₄ and 0.5 g./l. Merpol HCS, 80° C. for 20 min.
(2) 2 g./l. NaHSO₄ and 0.5 g./l. Merpol HCS, 100° C. for 20 min.
(3) (a) 2 g./l. NaHSO₄, 100° C. for 20 min. followed by (b) 0.5 g./l. Merpol HCS, 80° C. for 20 min.

Dyeing conditions

|  | Percent, OWF |
|---|---|
| Merpacyl Red L (C. I. Name-Acid Red) | 2 |
| Na₂SO₄ | 10 |
| Xylene (emulsified in 10% H₂O pH 2.0 45 min. to the boil, 90 min. at the boil) | 10 |

TABLE 3

| Sample | Pre-treatment | Dyeability | | | |
|---|---|---|---|---|---|
| | | Dye uptake, percent | Scour loss, percent | Dye utilization, percent | Cross-sectional dye penetration |
| A | 2 | 86.6 | 8.6 | 78.0 | Complete—uniform. |
| B | 1 | 91.4 | 12.0 | 79.4 | 25% penetration. |
| A | 2 | 88.8 | 9.4 | 79.4 | Complete—non-uniform. |
| B | 2 | 91.4 | 11.7 | 79.7 | 10% penetration. |
| A | 3 | 90.8 | 6.5 | 84.2 | Complete—uniform. |
| B | 3 | 88.0 | 5.9 | 82.1 | 10% penetration. |

It is clear from these data that the addition of a small percentage of sodium benzoate greatly improves the dye an ABS terpolymer and the same aminoalkyl methacrylate from Example I.

We claim as our invention:

1. Moldable polypropylene compositions consisting essentially of (a) polypropylene (b) at least one copolymer consisting essentially of ethylene and an aminoalkyl acrylate compound of the following general formula:

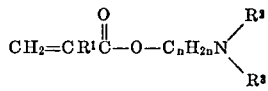

wherein R¹ is hydrogen or methyl, R² and R³ each is a member selected from the group consisting of hydrogen and alkyl of 1 to 4 carbon atoms, and $n$ is an integer of 1 to 4 inclusive, said copolymer containing from 5 to 50 mol percent of units derived from said aminoalkyl acrylate compound and having an intrinsic viscosity of 0.1 to 4.0 dl./g. measured in Tetralin solution at 130° C., the content of said copolymer being 3 to 7 percent based upon the weight of said polypropylene and (c) sodium benzoate the content of sodium benzoate being 0.1 to 0.5 weight percent based on polypropylene.

2. Moldable polyolefin compositions according to claim 1, wherein the said aminoalkyl acrylate compound is a member selected from the group consisting of N,N-dimethylaminoethyl acrylate, aminoethyl acrylate, N-methylaminoethyl acrylate, N-n-butylaminoethyl acrylate, N,N-di-n-butylaminoethyl acrylate, N,N-dimethylaminobutyl acrylate, and N,N-dimethylaminoethyl methacrylate.

References Cited

UNITED STATES PATENTS

| 3,395,198 | 7/1968 | Taniguchi et al. | 260—897 |
| 3,207,739 | 9/1965 | Wales | 260—93.7 |
| 3,659,009 | 4/1972 | Fuest et al. | 260—857 L |

MURRAY TILLMAN, Primary Examiner
J. SEIBERT, Assistant Examiner

U.S. Cl. X.R.
8—180; 260—889